Figure 1:
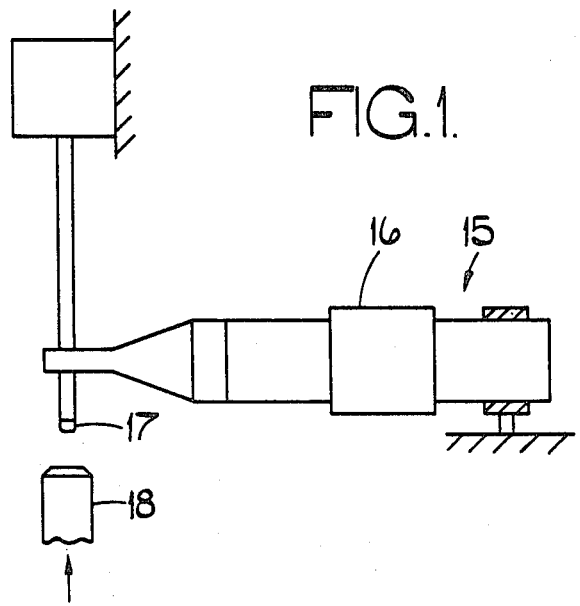

United States Patent [19]

Colloff

[11] 4,294,392
[45] Oct. 13, 1981

[54] METHOD OF JOINING A PAIR OF METAL PARTS

[75] Inventor: Nicholas J. Colloff, Sutton Coldfield, England

[73] Assignee: Lucas Industries Limited, Birmingham, England

[21] Appl. No.: 108,129

[22] Filed: Dec. 28, 1979

[30] Foreign Application Priority Data

Jan. 16, 1979 [GB] United Kingdom ................. 1598/79

[51] Int. Cl.³ .............................................. B23K 21/00
[52] U.S. Cl. ................................................... 228/111
[58] Field of Search ................................. 228/110, 111

[56] References Cited

U.S. PATENT DOCUMENTS

| | | | |
|---|---|---|---|
| 3,047,942 | 8/1962 | Schneider et al. | 228/111 |
| 3,662,454 | 5/1972 | Miller | 228/111 |
| 3,750,926 | 8/1973 | Sakamoto et al. | 228/110 |

FOREIGN PATENT DOCUMENTS

45301 12/1978 Japan ................................... 228/110

*Primary Examiner*—Joseph H. McGlynn
*Attorney, Agent, or Firm*—Trexler, Bushnell & Wolters, Ltd.

[57] ABSTRACT

In a method of joining a pair of metal parts, one of the parts is provided with an insulative coating at its surface to be joined to the other part, while the forming surface of the other part is free of any coating and defines a plurality of substantially parallel, longitudinally extending splines. To effect the required join, the joining surfaces of the parts are urged into interengagement and are simultaneously caused to undergo relative vibrational movement in a direction substantially parallel with the splines on the other part whereby, on termination of the vibration, a welded joint is produced between the parts.

4 Claims, 2 Drawing Figures

METHOD OF JOINING A PAIR OF METAL PARTS

This invention relates to a method of joining a pair of metal parts.

One known method of joining metal parts is vibration welding. This normally involves urging the metal parts into interengagement between a fixed anvil and a tool which is vibrated, normally at an ultrasonic frequency, in a direction parallel with the mating surfaces of the parts. The mating surfaces thereby undergo relative transverse sliding movement to cause a solid-phase welded joint to be produced between the parts. This method is widely used to join uncoated metal parts and has also been applied successfully to joining an uncoated copper wire to a further copper wire coated with shellac. In the latter case, it is found that the relatively rigid shellac-based coating on the surface to be welded of the further wire is effectively removed by the relative sliding movement which occurs during the vibration welding so that a substantially uniform joint of low electrical resistance can be produced.

A problem has, however, been experienced in the application of this known method to the joining of a pair of metal parts, in particular copper parts, in which one of the parts is provided with a coating of a resilient insulative material, such as an epoxy resin. In this case, it is found that the resilient insulative material tends to be trapped between the mating planar surfaces of the parts so that the only welding between the parts is at the edges of the mating surfaces. The resultant joint is therefore of low mechanical strength and high electrical resistance.

Various investigations have been carried out with a view to alleviating this problem. For example, the effect of using a conventional vibrating tool presenting a knurled surface to the metal parts to be joined has been investigated, but this arrangement by itself was found to be ineffective since the resilient insulative material still tended to be trapped between the mating surfaces of the metal parts. In addition, the provision of a knurled joining surface on the uncoated metal part has been tested, but again the resultant joint was unsatisfactory since the spaces around the knurls were found to be filled with the resilient insulative material.

An object of the present invention is therefore to provide a method of joining a pair of metal parts, in which the above mentioned problem is alleviated or overcome.

Accordingly, the invention resides, in its broadest aspect, in a method of joining a pair of metal parts wherein:

(a) at least one of the parts is provided with an insulative coating at its surface to be joined to the other part.

(b) at least one of the parts defines a plurality of substantially parallel, longitudinally extending splines at its surface to be joined to the other part, and (c) the joining surfaces of the parts are urged into interengagement and are simultaneously caused to undergo relative vibrational movement in a direction substantially parallel with said splines.

Using the method described in the preceding paragraph it is found that the insulative coating can be substantially completely removed from the joint area during the relative vibrational movement of the parts, irrespective of whether the insulative material is relatively rigid, such as shellac-based material, or is relatively resilient, such as an epoxy resin. The resultant joint between the parts is therefore of low electrical resistance and of a substantially uniform, high strength over the entire joint area.

Particularly advantageous results are achieved in accordance with a further aspect of the invention wherein:

(a) one of the parts is provided with an insulative coating at its surface to be joined to the other part, (b) at the joining surface of the other part, the metal of the other part is free of any coating and defines a plurality of substantially parallel, longitudinally extending splines, and (c) the joining surfaces of the parts are urged into interengagement and are simultaneously caused to undergo relative vibrational movement in a direction substantially parallel with the splines on said other part.

Preferably, the metal parts are formed of copper.

Preferably, the insulative coating on the one part is formed of a resilient material, and conveniently of an epoxy resin.

Figure 2:
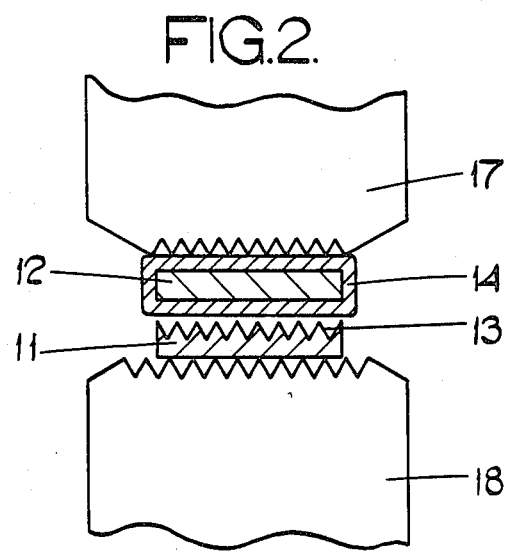

In the accompanying drawings,

FIG. 1 is a diagrammatic illustration of a method according to one example of the present invention, and FIG. 2 is a sectional view to an enlarged scale of part of FIG. 1.

Referring to the drawings, in the example shown it is required to join a bus-bar 11 to one end of a field coil 12 of a dynamo electric machine. The bus-bar 11 is composed of oxygen-free, high conductivity copper in drawn condition and is of generally rectangular cross-section such that, in one practical embodiment, its thickness was 0.267 cm and its width was 0.871 cm. Formed on one major surface of the bus-bar 11 are a plurality of contiguous, elongated, parallel splines 13 which, in said one practical embodiment, had a height of 0.064 cm with adjacent apices being spaced apart by 0.13 cm. The bus-bar 11 is free of any surface coating.

The field winding 12 is wound from a copper strip, again oxygen-free, high conductivity copper in drawn condition, and in said one practical embodiment the strip had a thickness of 0.244 cm and a width of 0.688 cm. In addition, the strip used to produce the winding 12 is provided with an epoxy resin coating 14, the epoxy resin used to produce this coating conveniently being that supplied by Drynamels as L series resin powder. In said one practical embodiment, the thickness of the epoxy resin coating 14 was between 0.013 cm and 0.015 cm.

As shown in FIG. 2, joining of the components 11, 12 is effected by means of an ultrasonic welding tool 15 including a piezoelectric transducer 16 which is operable to vibrate a reed 17 relative to an anvil 18. At their mutually presented end surfaces, the reed 17 and the anvil 18 are knurled, the knurling on the reed 17 being to a depth of 0.025 cm to 0.064 cm respectively. In each case, the knurls are defined by two sets of parallel grooves, with the grooves of the respective sets being inclined at an angle of 90° to each other.

To effect joining, the bus-bar 11 and said one end of the coil 12 are located between the reed 17 and the anvil 18, with the splined surface of the bus-bar being presented to the coil 12. A load conveniently of 2225-6675N is then applied to the anvil to urge the components 11, 12 into interengagement and simultaneously the transducer 16 is energised to vibrate the reed 17 in a direction parallel with the splines 13. The bus-bar 11 and coil 13 are thereby caused to undergo relative reciprocatory sliding motion in the direction of the splines 13. The vibration is continued for 0.5-2 seconds according to the magnitude of the applied load and, after termination of the vibration, a solid-phase welded joint is produced therebetween. Moreover, it is found that the epoxy resin coating 14 on the coil 13 has been removed from the area of the joint and that the joint is of substantially uniform strength and low electrical resistance.

In said one practical embodiment, the power supplied to the transducer was 3-4.2 kilowatts and the frequency and maximum amplitude of vibration of the reed 17 were 14.7 KHz and 0.003 cm respectively. Moreover, it was found that satisfactory joints were obtained with the following combinations of weld time and applied load:

0.5 second weld time: 6675N. applied load,
2 seconds weld time: 2225N. applied load, and
1.4 seconds weld time: 3338N. applied load.

I claim:

1. A method of joining a pair of metal parts wherein:
 (a) at least one of the parts is provided with an insulative coating at its surface to be joined to the other part,
 (b) at least one of the parts defines a plurality of substantially parallel, longitudinally extending splines at its surface to be joined to the other part, and
 (c) the joining surfaces of the parts are urged into interengagement and are simultaneously caused to undergo relative vibrational movement in a direction substantially parallel with said splines.

2. A method of joining a pair of metal parts wherein:
 (a) one of the parts is provided with an insulative coating at its surface to be joined to the other part,
 (b) at the joining surface of the other part, the metal of the other part is free of any coating and defines a plurality of substantially parallel, longitudinally extend splines, and
 (c) the joining surfaces of the parts are urged into interengagement and are simultaneously caused to undergo relative vibrational movement in a direction substantially parallel with the splines on said other part.

3. A method as claimed in claim 1 or claim 2, wherein the metal parts are formed of copper.

4. A method as claimed in claim 1 or claim 2, wherein the insulative coating on the one part is formed of an epoxy resin.

* * * * *